Patented Oct. 12, 1954

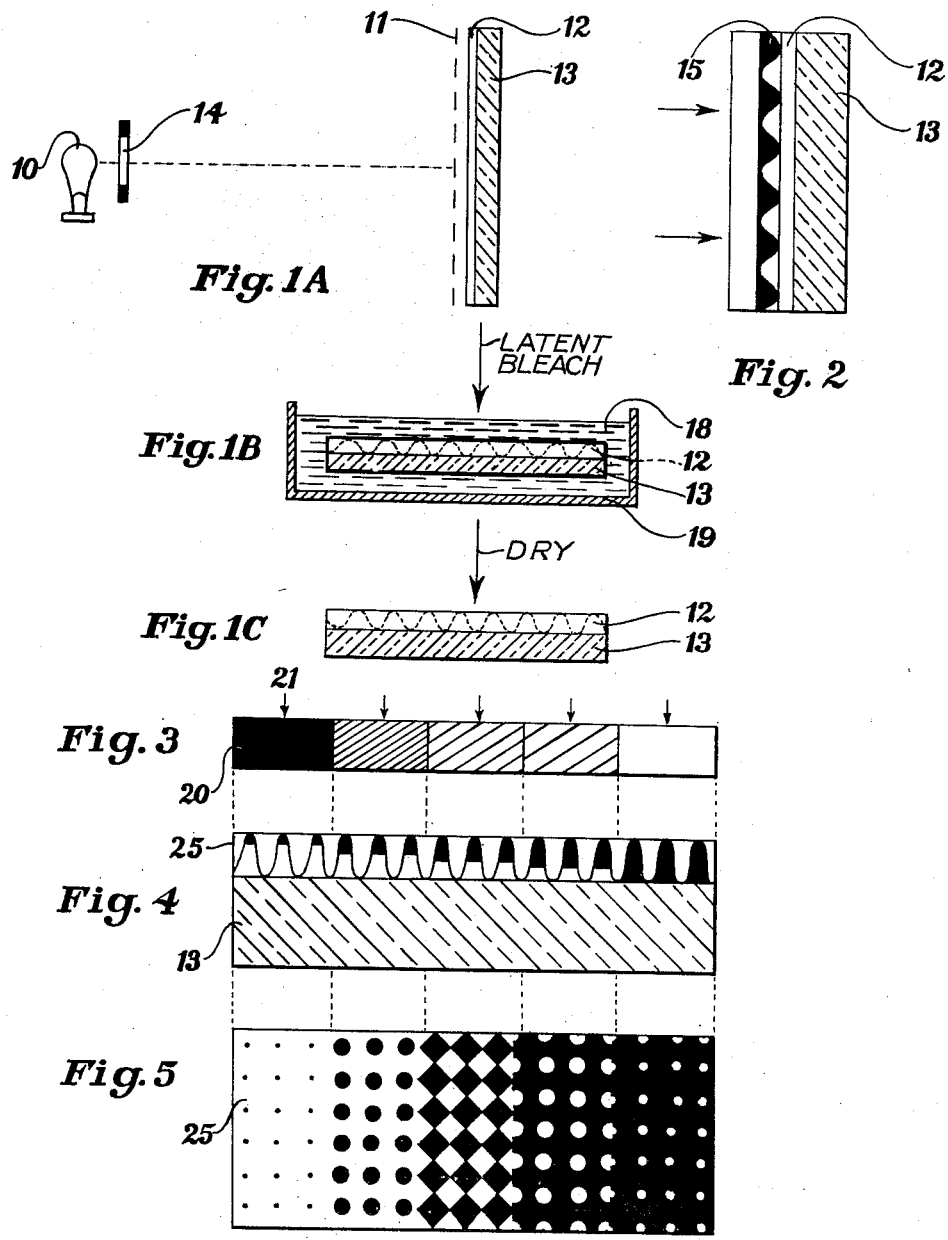

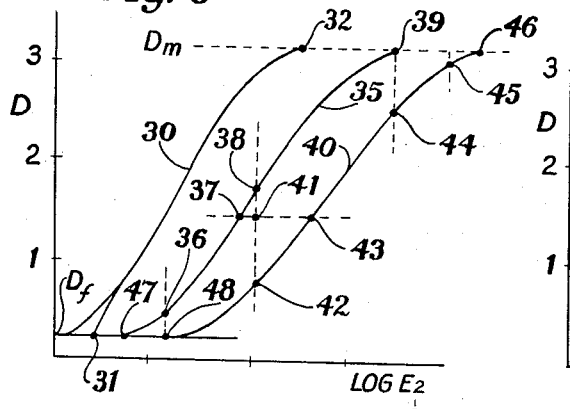
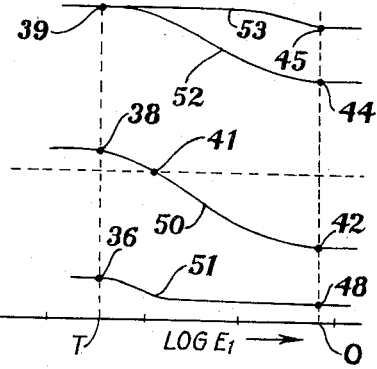
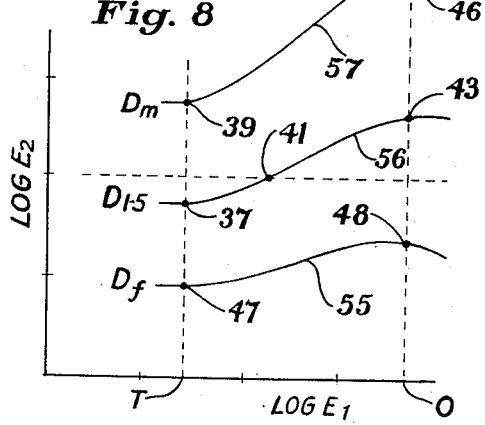
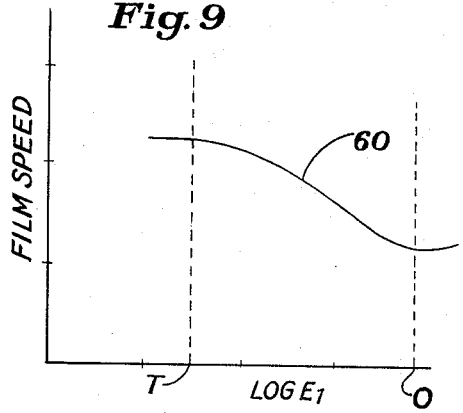
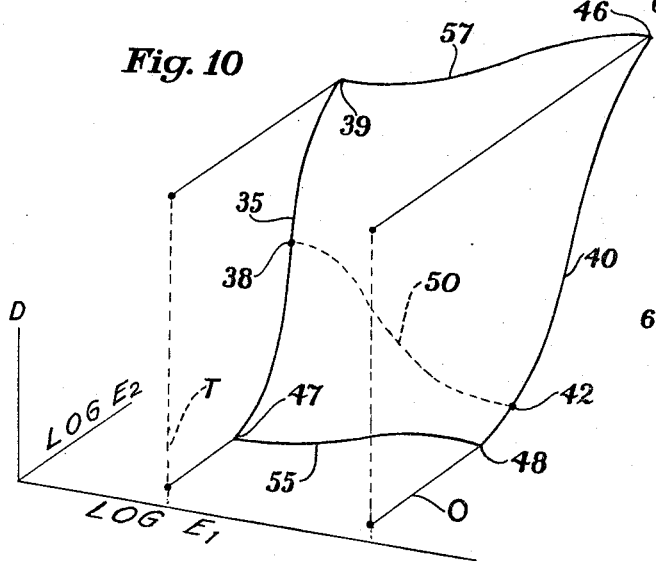
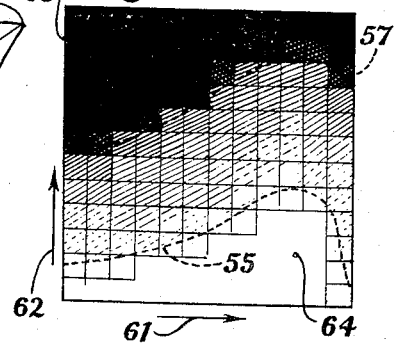
Richard E. Maurer
INVENTOR.

2,691,583

UNITED STATES PATENT OFFICE 2,691,583

PRESCREENED PHOTOGRAPHIC FILM
EMPLOYING ALBERT REVERSAL

Richard E. Maurer, Rochester, N. Y., assignor to Eastman Kodak Company, Rochester, N. Y., a corporation of New Jersey Application March 21, 1951, Serial No. 216,817

8 Claims. (Cl. 95—8)

1

This invention relates to prescreened photographic material for the making of halftone pictures directly without the use of a halftone screen and to the method of manufacture of such material.

The object of the invention is to provide a prescreened photographic material suitable for making halftone pictures by direct exposure in a camera or by contact printing from a continuous tone record without either a ruled or a graded element halftone screen. It is a particular object of the invention to provide such prescreened material which has a reasonably wide exposure latitude, gives uniform results and is stable under normal conditions of storage for extended periods of time.

It is a particular object of the invention to provide a prescreened film susceptible to manufacture by continuous methods rather than a sheet at a time.

The invention employs an effect known as the Albert effect or the Albert reversal which is similar to, but in many respects not the same as, partial desensitization. It involves a latent bleaching of photosensitive material such as a silver halide, but not in the sense of removal of the latent image since the latter would merely involve restoration of the original sensitivity. For a working knowledge of the phenomenon involved, reference is made to the brief (3 page) description of the Albert effect beginning on page 294 of "The Theory of the Photographic Process" by C. E. K. Mees, published August 1942, by the McMillan Company. In the present description it is assumed that the reader is aware of and understands the Albert effect at least to the extent set forth by Mees.

In the present invention the Albert effect is employed to provide a difference in sensitivity between the centers (maximum sensitivity) and the corners (minimum sensitivity) of the elements of a prescreened photographic film. Since the invention is directly applicable to all types of prescreened material, the terms "centers" and "corners" are used in their generic sense to refer to the points of maximum and minimum sensitivity in whatever form of halftone pattern is used.

The Albert effect involves exposure of a photosensitive material (a relatively intense exposure, but not necessarily sufficient to cause solarization) to an image, in the present case to a halftone image behind a ruled or a contact halftone screen. As will be discussed later, there is a threshold Albert exposure below which no Albert effect is observable. This exposure is always

2 greater than the threshold or inertia exposure of the film for ordinary development. There is also an optimum Albert exposure, above which the Albert reversal effect starts to decrease. This is only one of the ways in which the Albert reversal effect differs from straight chemical desensitization. It will be apparent from the present description and particularly from the discussion of the Albert effect in the Mees text referred to above, that the condition of the photosensitive grain after having been subject to the Albert exposure and latent bleach, is different from that obtained by desensitizing or, for that matter, by any other process. This unique product is normally referred to as Albert reversed material or material produced by the Albert effect process.

According to the present invention a prescreened material is made up with a halftone pattern of Albert reversal dot areas. The sensitivity at the corners of the dots, i. e., at the point which received the maximum Albert reversal is, in any practical embodiment of the present invention, equal to less than $\frac{1}{5}$ the sensitivity of the centers of the dots. The maximum gamma at the centers is greater than 4 and the maximum gamma at the corners is greater than 2, as obtained by applying the Albert process to photographic film of the type having a maximum gamma greater than 4. The bleach bath used in the Albert process may be referred to as a nonsolvent bleach bath.

The exposure should be between threshold and optimum Albert exposure, preferably with the exposure of the dot centers approximately equal to the threshold and the exposure of the dot corners approximately equal to the optimum Albert exposure. Although the threshold and optimum Albert exposures are characteristics of a material in exactly the same way as the inertia point and other points on the usual characteristic curve associated with simple development, the latter characteristic curve is the more commonly known one and if one wishes, the Albert exposure may be referred to the more usual characteristics by pointing out that the exposure of the centers of the dots should be between ordinary inertia point exposure and $10^4$ times this much with the exposures at the corners of the dots between 10 and $10^5$ times that given to the centers. Similarly the density range of the halftone screen used in giving the Albert exposure may be taken into account when describing the required Albert exposure for the corners and centers of the halftone dots. It is permissible to hypersensitize the film for example, in sodium sulfite solution after the Albert bleach has been given. This is not an essential part of the present invention. In fact, the hypersensitizing appears to affect the corners and the centers of the dots more or less uniformly, which results in a more sensitive material with approximately the same latitude. It is desirable to use a hypersensitizing which has greater effect on the centers than on the corners since this increases the latitude, but simple sodium sulfite solution appears to tend in the other direction reducing the latitude slightly.

The operation of the invention and many other advantages thereof will be understood from the following description of preferred embodiments when read in connection with the accompanying drawings in which:

Figs. 1A, 1B, and 1C constitute a flow chart diagrammatically representing the manufacture of a preferred embodiment of the invention;

Fig. 2 similarly represents an alternative arrangement for the first step of the process;

Figs. 3, 4 and 5 illustrate schematically the use of a prescreened material made according to the present invention;

Figs. 6 to 9 are graphs of the properties of material before and after the Albert effect;

Fig. 10 is a perspective view of a 3-dimensional graph of these properties; and

Fig. 11 shows a sensitometer strip for measuring Albert effect characteristics.

In Fig. 1A light from a light source 10 passes through a halftone screen 11 to expose a high contrast silver halide emulsion layer 12 carried on a support 13. It is common practice when exposing through a ruled halftone screen such as 11, to have the light distribution in the source arranged to give whatever exposure distribution is desired behind each screen element, diffraction being taken into account of course. In Fig. 1A this is accomplished by using a shaped aperture 14; a square or a four pointed star aperture is particularly useful in the present invention, but different exposure distributions require different apertures. The particular aperture shape is not an essential feature of the present invention. This exposure can alternatively be given through a contact halftone screen as schematically represented by element 15 in Fig. 2. The effective density of the screen 11 or of the screen 15 as measured at the surface of the emulsion layer 12 varies and the centers of the ultimate halftone dots receive the minimum exposure whereas the corners receive the maximum exposure. That is, the centers are immediately behind the opaque lines of the screen 11 in Fig. 1A and the corners are exposed through the apertures in the screen 11. The distribution of exposure from the corners to the centers of the dots is in accordance with the aperture stop 14 and the diffraction pattern formed on the layer 12 in Fig. 1A or in accordance with the density of the contact screen 15 in Fig. 2. The ultimate tone reproduction available with the prescreened material according to the invention depends on this distribution of exposure. This exposure is a relatively long one, usually more than $\frac{1}{10}$ of a second and the intensity of the light at the emulsion layer 12, multiplied by the length of the exposure, gives the exposure itself which is preferably between the threshold Albert exposure and the optimum Albert exposure for all points of the emulsion layer 12. In the most preferred embodiment of the invention the exposure of the centers of the dots is approximately equal to the threshold of the Albert exposure and the exposure of the corners of the dots is approximately equal to the optimum Albert exposure but this preferred feature is of course not absolutely essential.

As shown in Fig. 1B the exposed film without any development or fixing, is immersed in a nonsolvent bleach bath 18 carried in a container 19; i. e. the bath is a nonsolvent for silver halide but would affect metallic silver if any is present. The usual bath is either an aqueous solution of nitric acid, or an aqueous solution of copper sulfate and potassium bromide. Mees' text (p. 296) mentioned above gives another nonsolvent bleach bath. For example, a standard high contrast film of the type used commercially in the graphic arts is exposed through a magenta contact halftone screen (133 lines per inch) to a standard R2 photoflood lamp at a distance of two feet for two minutes. The results are practically the same for 1½-minute and four-minute exposures which indicates that the exposure is not critical; this is because threshold and optimum exposures are not sharply defined and because it is only necessary to approximate these exposures anyway. The exposed film is then immersed for one minute (two minutes gives practically no additional effect) at 68° F. in a bleach bath such as A. 2.5 g. KBr
   1 liter of .018% aqueous solution of potassium ferricyanide or B. 20 g. $CUSO_4.5(H_2O)$ (copper sulfate)
   0.5 g. KBr
   1 liter water The film is then washed for about five minutes at 68° F. and dried.

Thus after the latent bleach to produce the Albert effect, the film is dried and is ready for sale to the ultimate user who may employ it for the making of halftones by exposing it to a continuous tone image and then developing it in the standard developer used with high contrast films. As shown in Fig. 3 the operation of this film can be described with reference to printing from a step tablet 20. That is, the original subject is represented by a step tablet 20 having five density levels. Light represented by arrows 21 passes through this step tablet 20 to expose a photosensitive material according to the invention as represented in Fig. 4. The emulsion layer 25 is schematically represented as it is after development. The tops of the least Albert exposed (least bleached) areas are the only parts exposed through the densest portion of the step tablet 20, and the less sensitive areas of each dot are successively exposed through the successively less dense steps. As illustrated in Fig. 5 the final image constitutes a normal halftone negative of the tablet 20.

In the sensitometry of the Albert effect, one simple method of measuring the various characteristics is to give an Albert exposure through a step tablet of suitable densities, then to bleach and dry the film and then to give a second or normal exposure to the film through a step tablet at right angles to the direction or orientation employed during the original exposure. The film is then developed normally and constitutes a two-dimensional sensitometric strip. A picture of such a sensitometer strip after development is shown in Fig. 11, increasing first exposure being represented by the arrow 61 and increasing second or normal exposure being represented by the arrow 62. The curves in Figs. 6 to 10 are plotted from the densities read from such a sensitometer strip.

In Fig. 6 the curve 30 represents the normal characteristic of a high contrast emulsion in which density is plotted against the logarithm of the exposure, which in this case is the second exposure i. e., the one given after the film has been prepared. That is, curve 30 is the H and D curve of the emulsion without any Albert treatment. The horizontal densities $D_f$ and $D_m$ represent fog density and maximum density respectively, the point 31 being the inertia point by normal definition and the point 32 being the shoulder of the curve. In order to understand the Albert effect fully, curve 35 is included to represent the effect of the bleach bath alone, i. e., without any Albert exposure. The nonsolvent bleach bath acts more or less as a uniform desensitizer through the whole range of the exposure latitude of the film. Such desensitizing is not employed in the present invention since it is applied equally to the centers and corners of the dots. However, since the centers of the dots are given either no exposure at all or are given an exposure approximately equal to or below the threshold Albert exposure, the curve 35 also represents the characteristic of the emulsion in the centers of the dots. The corners of the dots are given an optimum or at least a considerable Albert exposure prior to the bleaching and thus due to the Albert reversal effect the corners have a characteristic represented by the curve 40 in Fig. 6. It will be understood that Fig. 6 does not demonstrate in any way the amount of the Albert exposure other than the fact that the characteristic curve of the emulsion will lie somewhere between the curve 35 and the curve 40 depending on the value of the Albert exposure. What Fig. 6 does demonstrate is the ordinary characteristic (H and D) curve of the photographic materials involved (i. e., after treatment, the centers and corners of the dots can be considered different materials since they have different characteristics).

Standard high contrast film exposed two minutes to an R2 photoflood lamp at two feet through a magenta contact screen and bleached in the copper sulphate, potassium bromide bleach specified above results in curves in which curve 35 has ⅓ of the speed of the curve 30 at a density of 1 and curve 40 at this same density has only 1/16 the speed of the curve 35. This represents an exposure latitude of 16 to 1 in the finished product. In this case curve 35 is much closer to curve 30 than shown in Fig. 6.

To permit direct comparison of the various relationships involved in Figs. 6 to 10, a number of representative points on curve 35 (47, 36, 37, 38 and 39) and a number of points on curve 40 (48, 42, 43, 44, 45, 46) as well as the point 41 intermediate between the two curves, are labeled and the same numbers designate the corresponding points in the various graphs.

In Fig. 7 the effect of the first or Albert exposure is represented in terms of the ultimate density. Curve 50 is an average curve for an area of the film which records the middle tones. That is, the curve 50 represents the density plotted against the Albert exposure for film whose second exposure is constant and represented by the vertical broken line passing through the points 38, 41 and 42 in Fig. 6. The minimum Albert exposure is represented by a vertical line in Fig. 7 labeled T and the optimum Albert exposure is similarly represented by a vertical line labeled O. In Fig. 7 all curves are horizontal to the left of the vertical line T and are either horizontal or turned upward to the right of the line O. The curve 51 corresponds to a shadow in the original subject so that there is very little second exposure. A very small dot is thus formed represented by the point 36 since the corners of the dots represented by the point 48 and much of the dot near the corners receive no effective exposure. That is the curve 51 is not appreciably above fog density except near the threshold Albert exposure T. The curve 52, on the other hand, represents a highlight or very light tone which varies in density between the points 39 and 44 depending on the degree of Albert exposure. An extreme highlight, represented by the point 45 in Fig. 6, gives a maximum density as represented by the curve 53 in Fig. 7 for all of the dot except the very corner itself. Still more intense exposures result in a horizontal line at maximum density.

Fig. 8 plots the relationship of the second exposure to the Albert exposure for constant densities. The curve 55 being for fog density, the curve 56 being for a density of 1.5 and the curve 57 being for maximum density. It will be noted that these curves correspond to the distribution of constant density areas in Fig. 11. The curve 57 representing the border of the black area 63 and the curve 55 representing the border of the clear area 64.

Fig. 9 represents what may be termed the Albert characteristic curve of the film in which film speed is plotted against the curve 60. This is only a generalized representation and the criterion of "film speed" is therefore not specified except that increasing ordinates means increasing speed. The threshold Albert exposure gives or rather leaves a maximum film speed and the optimum Albert exposure results in a minimum film speed. This reduction in speed is referred to as an Albert reversal since it is not an absolute desensitization but merely a relative one.

If one combines the curves shown in Figs. 6, 7 and 8 to form a 3-dimensional diagram, the result is shown in Fig. 10. The projection of curves 35 and 40 on the $D$:log $E_2$ plane gives the curves 35 and 40 as seen in Fig. 6, whereas the projection of the curves 55 and 57 into this same plane merely appear as horizontal straight lines and the projection of the curve 50 in this same plane appears as a vertical straight line. Similarly the curves 35 and 40 projected onto the $D$:log $E_1$ plane are vertical straight lines representing the threshold and optimum Albert exposures, the curves 55 and 57 are horizontal straight lines representing fog density and maximum density respectively whereas the curve 50 is just that shown in Fig. 7. The third projection namely that onto the horizontal plane log $E_2$: log $E_1$ results in straight lines for the curves 35, 40 and 50 but gives the curves 55 and 57 as shown in Fig. 8. A 3-dimensional surface can be visualized in Fig. 10. This surface represents the operation of the present invention for those interested in the scientific principles involved, but the invention is fully understandable without reference to this precise illustration. It is included for completeness because it is not readily available in textbooks on photography.

Having thus described my invention I wish to point out that it is not limited to these specific examples, but is of the scope of the appended claims.

I claim:

1. A photographic halftone material comprising a flat support and a uniformly thick photosensitive silver halide emulsion layer on the support with a halftone pattern of Albert reversal dot areas the halftone pattern being a uniformly distributed undulating one with a sensitivity at the maximum reversed points which are called the corners of the dot areas, equal to less than one-fifth the sensitivity at the centers of the dots, produced by a process which includes exposure of the layer through a halftone screen between threshold Albert and optimum Albert exposure for all points of the dot pattern and immersing the exposed layer in a bleach bath which is nonsolvent for silver halide.

2. A photographic halftone material comprising a film base and a uniformly thick photosensitive silver halide emulsion layer on the base with a halftone pattern of Albert reversal dot areas the halftone pattern being a uniformly distributed undulating one with a sensitivity at the maximum reversed points hereinafter called the corners of the dots, equal to less than one-fifth the sensitivity at the centers of the dots, produced by a process which includes exposure through a halftone screen and Albert bleaching of the exposed layer, the sensitivity at said centers being that from approximately threshold Albert exposure and the sensitivity at said corners being that from approximately optimum Albert exposure and the sensitivity at all other points of each dot area being between these two values.

3. A photographic halftone material comprising a flat support and a uniformly thick photosensitive silver halide emulsion layer on the support with a maximum gamma greater than four and with a halftone pattern of Albert reversal dot areas the halftone pattern being a uniformly distributed undulating one with a sensitivity at the maximum reversed points hereinafter called the corners of the dots equal to less than one-fifth the sensitivity at the centers of the dots and with a maximum gamma at the corners greater than two, produced by a process which includes exposure of the layer through a halftone screen with the exposure at said centers between inertia point exposure and $10^4$ times the inertia point exposure and with the exposures at said corners between 10 and $10^5$ times that at said centers and immersing the exposed layer in a bleach bath which is nonsolvent for silver halide.

4. The method of making a halftone sensitive material which comprises uniformly illuminating a halftone screen to form behind the screen a halftone pattern of light of undulating intensity, exposing a high contrast photosensitive silver halide emulsion layer to said pattern of light for a time interval $t$, more than one-tenth second, such that the intensity at substantially every point of the pattern, when multiplied by $t$, is between threshold Albert exposure and optimum Albert exposure, uniformly bleaching the exposed but undeveloped layer in a bleach bath which is nonsolvent for silver halide to reduce the film speed in the maximum exposed areas relative to that in the minimum exposed areas and drying the film.

5. The method according to claim 4 in which the maximum exposure to produce the corners of the halftone dots is approximately equal to said optimum Albert exposure.

6. The method according to claim 4 in which the minimum exposure to produce the centers of the halftone dots is approximately equal to said threshold Albert exposure.

7. The method of making halftone sensitive material which comprises uniformly illuminating a halftone screen to form behind the screen a halftone pattern of light of intensity undulating across each dot between a minimum intensity $I_1$ and a maximum intensity $I_2$, exposing a high contrast photosensitive silver halide emulsion layer to said pattern of light for a time interval $t$, the effective screen density producing $I_1$ and $I_2$ being such that $I_1 t$ approximately equals threshold Albert exposure and $I_2 t$ approximately equals optimum Albert exposure, uniformly bleaching the exposed but undeveloped layer in an Albert bleach bath and drying the layer.

8. The method according to claim 7 including the additional step of hypersensitizing the layer in sodium sulfite solution after said bleaching.

References Cited in the file of this patent

UNITED STATES PATENTS

| Number | Name | Date |
|---|---|---|
| 2,102,021 | Murray | Dec. 14, 1937 |

FOREIGN PATENTS

| Number | Country | Date |
|---|---|---|
| 9,921 | Great Britain | of 1889 |
| 250,770 | Great Britain | Apr. 22, 1926 |
| 937,885 | France | Mar. 22, 1948 |

OTHER REFERENCES

Mees: "The Theory of the Photographic Process," McMillan, 1942, pages 294–297.